United States Patent [19]

Blasbalg

[11] 3,731,198

[45] May 1, 1973

[54] SYNCHRONIZATION DEVICE FOR ANTI-JAMMING COMMUNICATIONS SYSTEM

[75] Inventor: Herman L. Blasbalg, Baltimore, Md.

[73] Assignee: International Business Machines Corporation, Armonk, N.Y.

[22] Filed: Aug. 25, 1966

[21] Appl. No.: 575,501

[52] U.S. Cl. ......................325/42, 178/69.5, 325/32, 325/58, 325/65

[51] Int. Cl. ............................H04b 1/10, H04l 7/00

[58] Field of Search......................325/32, 34, 40, 42, 325/65; 178/69.5; 340/204, 318, 348; 343/18 E

[56] References Cited

UNITED STATES PATENTS

| | | | |
|---|---|---|---|
| 3,370,126 | 2/1968 | Scidmore | 325/32 |
| 3,244,808 | 4/1966 | Roberts | 325/42 X |
| 3,305,636 | 2/1967 | Webb | 325/40 X |

*Primary Examiner*—Benjamin A. Borchelt
*Assistant Examiner*—H. A. Birmiel
*Attorney*—Hanifin and Clark and Maurice H. Klitzman

[57] ABSTRACT

The invention is a synchronizing device for an anti-jam communications system producing at the transmitting station a synchronizing pulse formed by introducing a clock pulse into a matched filter pulse shaping network controlled by a shift register pseudo-noise sequence generator. At the receiving station a mirror image of the matched filter pulse shaping network is provided to decode the synchronizing pulse and eventually synchronize the clock at the receiving station.

7 Claims, 7 Drawing Figures

INVENTOR
HERMAN L. BLASBALG

BY J. Jaun Jr.
ATTORNEY

SYNCHRONIZATION DEVICE FOR ANTI-JAMMING COMMUNICATIONS SYSTEM

This invention relates to anti-jam communications systems and, more particularly, to means for synchronizing the transmitter and receiver in such anti-jam communications systems.

In general, modern anti-jam communications systems must be able to operate successfully in the presence of at least two types of jamming. One type of jamming involves the flooding of the transmission channel with large amounts of artificial noise. The second type of jamming involves the interception of transmission signals and their reinsertion into the transmission channel after a short delay. Both types of jamming are designed to induce a sufficient number of errors in the system as to render communications unintelligible.

If jamming should succeed in rendering unintelligible a certain portion of the transmitted information, resort may be had to a retransmission of the information in order to clear up the difficulty. On the other hand, if, as a result of jamming, the synchronization of the system is broken, all of the subsequently transmitted information will be lost, retransmission will be impossible, and resort must be had to some sort of secondary system in order to reacquire synchronization. Therefore, it is apparent that loss of synchronization presents a serious difficulty for anti-jam communications systems. It is further apparent that because synchronizing signals must be repeated at regular intervals, they are particularly vulnerable to jamming.

It is therefore an object of this invention to provide improved synchronizing means for anti-jam communications systems.

More particularly, it is an object of this invention to provide synchronizing means which are highly resistant to jamming by means of artificial noise.

It is also an object of this invention to provide synchronizing means which are highly resistant to jamming by means of intercepting and retransmission of the same or similar synchronizing signals.

According to these and other objects of my invention, I provide synchronizing means for an anti-jam communications system comprising, at the transmitting station, a matched filter pulse shaping network controlled by a shift register pseudo-noise (PN) sequence generator. The shift register pseudo-noise sequence generator is stepped along at a slow rate by the transmitting station clock so as to present a new PN sequence for controlling the matched filter pulse shaping network during each transmission cycle. At some time during each cycle a pulse is introduced into the matched filter network under control of the transmitting station clock. This pulse is transformed into a characteristic waveform under control of the current PN sequence stored in the PN sequence generator.

At the receiving station I provide a matched filter pulse responsive network under control of a PN sequence generator identical to the PN sequence generator at the transmitting station. Further, the PN sequence generator at the receiving station is made to contain the same PN sequence as its counterpart at the transmitting station. The PN sequence generator at the receiving station is stepped along at a slow rate by the receiving station clock so that, during each cycle, the matched filter network at the receiving station will be responsive only to synchronizing waveforms generated at the transmitting station during that particular cycle.

Because the combination of a matched filter pulse shaping network at the transmitting station, and a matched filter pulse responsive network at the receiving station provides for extremely effective discrimination of the synchronizing signal from the channel noise, my anti-jam communication system synchronizer is extremely resistant to the type of jamming which involves the flooding of the transmission channel with large amounts of artificial noise. Further, because the PN sequence generators provide for the transmission and selective reception of a different synchronizing waveform during each cycle, my anti-jam communication systems synchronizer is especially resistant to the type of jamming which involves the interception and retransmission, after a short delay, of the same or similar synchronizing waveforms.

In order to provide an additional measure of protection for the synchronizing signals, a modified form of my invention includes means for changing the frequency band of the synchronizing signals from cycle to cycle in a pseudo-random fashion. This result is accomplished by means of a digital-to-analog converter responsive to selected stages of the pseudo-noise sequence generator at the transmitting station. The output of the digital-to-analog converter controls a voltage controlled oscillator which generates the carrier frequency for the synchronizing signal produced by the matched filter pulse shaping network. At the receiving station, a similar digital-to-analog converter and voltage controlled oscillator serves to demodulate the received synchronizing signal for presentation to the matched filter pulse responsive network. It can be seen that the pseudo-random frequency hopping feature provides an additional measure of protection against both of the above-mentioned types of jamming. On the one hand, in order to successfully jam the synchronizing signal, the jammer is compelled to expend larger amounts of artificial noise energy over a broader bandwidth. On the other hand, the randomness of the frequency hopping feature provides additional protection against the interception and retransmission technique.

According to still a further modification of my invention, I find that my anti-jam communications system synchronizer may be advantageously combined with certain data encoding means in order to provide an additional measure of security for the encoded data. More particularly, in communications systems wherein a PN sequence generator is employed for the purpose of encoding the data to be transmitted, the contents of selected stages of the PN sequence generator of my synchronizer can be used to periodically initialize the contents of the PN sequence generator which serves to encode the data. For example, the contents of selected stages of the PN sequence generator of the synchronizer can be used to initialize the encoder at the beginning of each synchronizing period. The effect of this procedure is to greatly increase the effective length of time that the data encoder can operate before its PN sequences begin to repeat.

An advantage of my invention is that with normal operating rates, and with shift registers of modes length, my anti-jam communications systems synchronizer can be expected to operate for as long as one or two years without ever using the same synchronizing signal more than once.

Other objects and advantages of my invention will be pointed out in the following description and claims and illustrated in the accompanying drawings, which disclose, by way of example, the principle of the invention and the best mode which has been contemplated of applying that principle.

Figure 1:
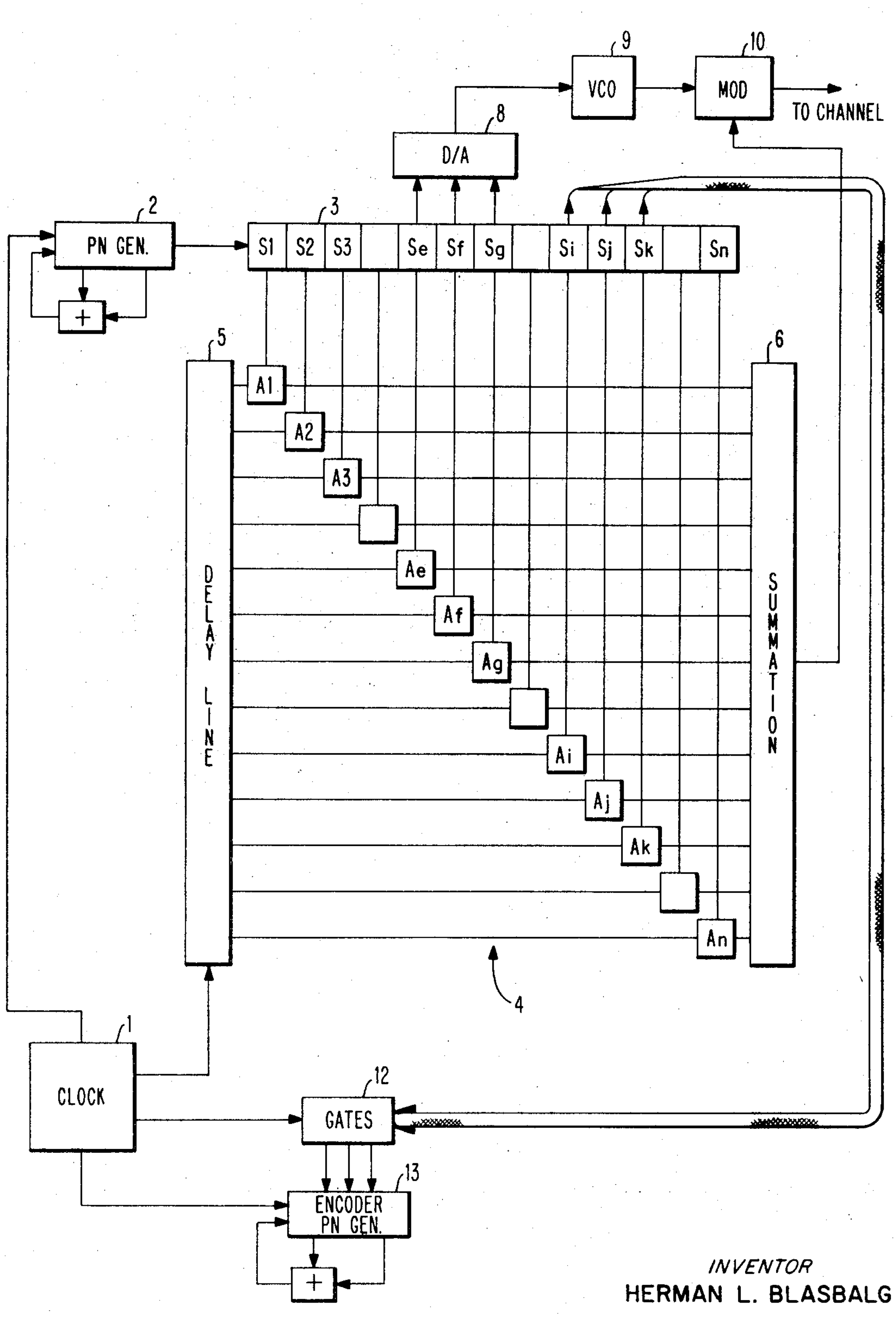
FIG. 1 shows a block diagram of the transmitting station portion of my anti-jam communications system synchronizer.

Before describing the detailed structure and operation of my anti-jam communications system synchronizer, it is desirable to present a general discussion of the features and properties of my invention.

GENERAL DESCRIPTION

In its broadest aspect, my invention provides at the transmitting station a signal shaping network controlled by a pseudo-noise generator, and, at the receiving station, a matched signal decoding network controlled by an identical pseudo-noise generator. Although the principles of my invention embrace any form of signal shaping network and matched signal decoding network, the preferred embodiment of my invention employs tapped delay line matched filters at the transmitter and receiver. These tapped delay line matched filters may be of the type described in "Digital Communications with Space Applications" by S. W. Golomb, L. D. Baumert, M. E. Easterling, J. J. Stiffler, and A. J. Viterbi; Prentice-Hall, 1964. The shift register PN sequence generators which control the taps of the matched filters may be of the type described in the same reference.

In a practical application, the matched filter may have as many as one thousand taps. The PN sequence generator shows a shift register which has at least as many stages as the matched filter has taps. Each matched filter tap is controlled by a shift register stage. Each time the PN sequence generator is stepped, the contents of the shift register are shifted, and the conditions of the switches on the matched filter taps are changed. During the period between each shift, the matched filter produces a synchronizing signal in response to a pulse applied to its input. Because the shape of the synchronizing signal depends upon the states of all of the matched filter taps, and because the states of the taps are changed after each synchronizing signal is transmitted, each synchronizing signal will have a different shape from the previous one. In fact, no two synchronizing signals will be the same until the sequence produced by the PN sequence generator begins to repeat itself. Assuming practical shift rates, and assuming PN sequence generators of a practical size, it can be expected that the sequence will not begin to repeat itself for 1 or 2 years.

The PN sequence generators at the transmitter and receiver are stepped at a very slow rate. For example, in a practical application, the PN sequence generators at the transmitter and receiver may be stepped at the rate of about one shift per second. At this slow rate, the stages of the PN sequence generators at the transmitter and receiver will be predominantly in synchronism even though the actual shifts are not precisely synchronous in time. This will allow the accurate reception of the synchronizing signal at the receiving station even though there is a slight relative drift between the transmitting station and receiving station clocks provided that the duration of the synchronizing signal is substantially shorter than the time between shifts of the PN sequence generators. For example, let $T_m$ stand for the duration of the synchronizing signal produced by the matched filter at the transmitting station. Let $T_s$ be the time between shifts of the PN sequence generator. In practice, a reasonable value for $T_m$ might be 100 microseconds, and a reasonable value for $T_s$ might be one second as mentioned above. Using these values, and assuming that the synchronizing signal is transmitted approximately midway between two shifts of the PN sequence generator at the transmitting station, it can be seen that the synchronizing signal will be properly decoded at the receiving station provided that the PN sequence generator at the receiving station is within the plus or minus approximately ½ second of synchronism with the PN sequence generator at the transmitting station. Thus, it can be seen that in view of the clock accuracies possible under the present state of the art, my invention provides a generous margin for the acquisition of synchronism between the transmitting station and receiving station of a communication system.

In order to achieve a greater margin of protection against jamming, it is advantageous to randomly shift the frequency of the synchronizing signal. If W is the bandwidth of the synchronizing signal, and $W_O$ is the entire available frequency band, then K, the number of frequency channels that are as broad as the synchronizing signal, is equal to $W_O/W$. Assuming that the jammer must attempt to jam the entire frequency band $W_O$, the signal-to-noise ratio is given by:

$$\eta^2 = \frac{S^2 T_m}{N_0 + \frac{J^2}{W_0}} = \frac{S^2}{\frac{N_0}{T_m} + \frac{J^2}{W_0 T_m}} + \frac{S^2}{\frac{N_0}{T_m} + \frac{J^2}{KWT_m}}$$

$$= K \cdot WT_m \cdot \frac{S^2}{O_N^2 + J^2}$$

where $N_o$ = thermal noise energy (watts/cps)

$J^2$ = jamming power $N_O/T_m$ = thermal noise power at output of matched filter $S^2$ = signal power $O_N^2$ = noise power in band $KW = W_o$.

Hence, it can be seen that a random shifting of the synchronizing signal between K frequency bands serves to decrease the jamming effectiveness by a factor of K.

The frequency band in which a particular synchronizing signal is transmitted is determined by the content of selected stages of the shift register at the time of transmission. For example, if 32 frequency bands are available, the contents of five stages of the shift register ($2^5 = 32$) would be used to select a frequency band for each synchronizing signal. In the preferred form of my invention the contents of the five shift register stages are presented to a digital-to-analog converter. The output from the digital-to-analog converter feeds a voltage controlled oscillator, the output of which serves as a carrier frequency for the synchronizing signal. According to an alternate embodiment of my invention the contents of the five shift register stages are used as a binary code for selecting one of 32 oscillators. In both cases, the pseudo-random character of the contents of the shift register stages provides for a pseudo-random selection of the frequency band for each synchronizing signal.

The contents of the five corresponding stages of the shift register at the receiving station are presented to a digital-to-analog converter, the output of which feeds a voltage controlled oscillator. The output of the voltage controlled oscillator feeds a demodulator which serves to recover the basic synchronizing signal for presentation to the matched filter. In this manner the receiving station is able to follow the pseudo-random frequency hopping of the synchronizing signal.

As mentioned above, an additional advantage of my invention is apparent when my synchronizer is employed in a communications system wherein PN sequence generators are employed for the purpose of encoding the data. In such communications systems, the PN sequence generators often operate at very high rates. For example, the PN sequence generators might be expected to operate in the megacycle range. At such high rates, the pseudo-random sequence produced by any reasonably small PN sequence generator will begin to repeat after a fairly short time. Such repetition permits powerful techniques of analysis to be applied to the encoded data, and thus seriously jeopardizes the security of the communications system. This problem can be overcome by using the contents of selected stages of the shift register of my synchronizer to periodically initialize the contents of the PN sequence generator in the data encoder. For example, the PN sequence generator in the data encoder might be initialized once during each synchronizing period. In this manner, the PN sequence generator in the data encoder can be made to operate virtually indefinitely without repeating.

STRUCTURE

FIG. 1 shows a block diagram of the transmitting station portion of my anti-jam communications system synchronizer. The transmitting station clock 1 drives PN sequence generator 2 which loads shift register 3. Shift register 3 includes n stages designated $S_1, S_2, \ldots S_n$. In a practical application, shift register 3 may include as many as one thousand stages or more.

Pulse shaping network 4 includes tapped delay line 5 which may have as many as one thousand taps or more. Each of the delay line taps is controlled by a binary weighting network $A_1, A_2, \ldots A_n$ which may be simply binary gates. The binary weighting networks $A_1, A_2, \ldots A_n$ are controlled by the contents of shifter register stages $S_1, S_2, \ldots S_n$. The outputs of binary weighting networks $A_1, A_2, \ldots A_n$ are applied to summing network 6 to produce the synchronizing signal.

Digital-to-analog converter 8 receives inputs from shift register stages $S_e$, $S_f$ and $S_g$. The output from digital-to-analog converter 8 is applied to voltage controlled oscillator 9, the output of which serves as the carrier frequency for the synchronizing signal. Both the output from voltage controlled oscillator 9 and the synchronizing signal from summation device 6 are applied to modulator 10. The output from modulator 10 is the basic synchronizing signal raised to the selected carrier band. This signal is transmitted over the channel.

FIG. 1 also shows the means for initializing the PN generator in the data encoder. The contents of shift register stages $S_i$, $S_j$ and $S_k$ are applied to the encoder PN generator 13 through gates 12 under the control of the transmitting station clock, or perhaps under the control of the same pulse which serves to initiate the synchronizing signal.

Figure 4:
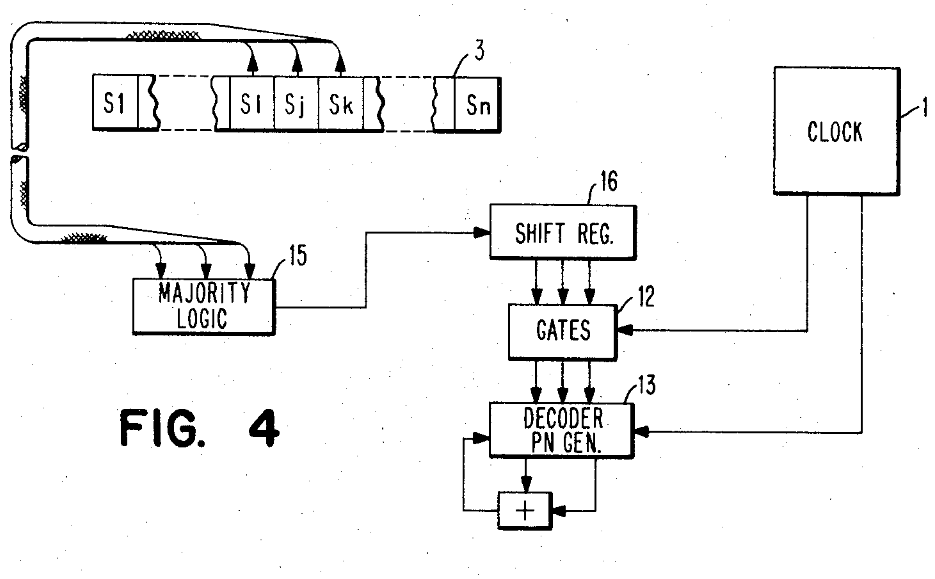
FIG. 4 shows a block diagram of a modified means for initializing the pseudo-random sequence generator of the data encoder.

FIG. 4 shows an alternate means for initializing the PN sequence generator in the data encoder. In FIG. 4, the contents of synchronizer shift register stages $S_i$, $S_j$ and $S_k$ are applied to majority logic circuit 15. Majority logic circuit 15 produces a binary "1" output when more "1's" than "0's" are applied to its inputs. The outputs of majority logic circuit 15 loads shift register 16. It is noted that shift register 16 will always contain a pseudo-random code which is derived by majority logic from the pseudo-random contents of stages $S_i$, $S_j$ and $S_k$ of the synchronizer shift register over several synchronizing periods. The contents of shift register 16 are applied to the encoder PN generator 13 through gates 12 under control of the transmitting station clock. This modified means for initializing the PN sequence generator in the data encoder serves to provide an additional measure of security for the communications system.

Figure 2:
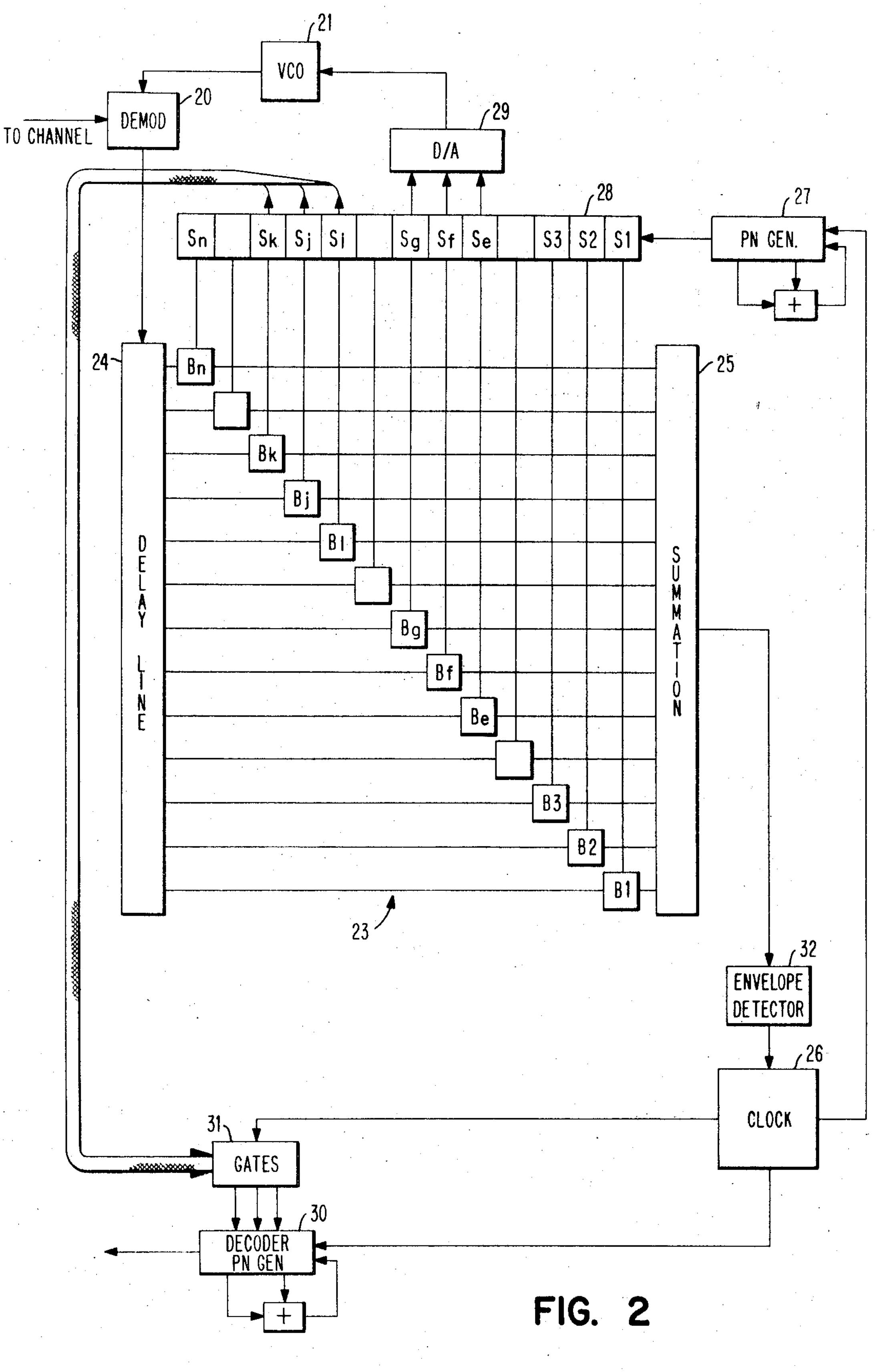
FIG. 2 shows a block diagram of the receiving station portion of my anti-jam communications systems synchronizer.

FIG. 2 shows the receiving portion of my anti-jam communications system synchronizer. Demodulator 20 is an RF mixer which receives signals from the transmission channel, and serves to recover the basic synchronizing signal from its particular frequency band under control of the output signal from voltage controlled oscillator 21. The basic synchronizing signal from demodulator 20 is applied to signal decoding networks 23. More particularly, the synchronizing signal from demodulator 20 is applied to tapped delay line 24 which is a bandpass line. Each tap of delay line 24 is controlled by a binary weighting network $B_1, B_2, \ldots B_n$ which may be simply a binary gate. Each binary weighting network $B_1, B_2, \ldots B_n$ is controlled by the contents of one of the stages $S_1, S_2, \ldots S_n$ of shift register 28. The outputs from binary weighting networks $B_1, B_2, \ldots B_n$ are applied to summing network 25. The output of summing network 25 passes through envelope detector 32, which may be the usual diode type, and yields a large pulse when the proper synchronizing signal is applied to tapped delay line 24. The output pulse from summing device 25 via envelope detector 32 serves to synchronize the receiving station clock 26. Receiving station clock 26 drives PN sequence generator 27 which is identical to PN sequence generator 2 at the transmitting station shown in FIG. 1. PN sequence generator 27 loads shift register 28 which in turn controls signal decoding network 23 as described.

The contents of shift register stages $S_e$, $S_f$ and $S_g$ are applied to digital-to-analog converter 29, the output of which is applied to voltage controlled oscillator 21 which in turn produces an output frequency corresponding to the carrier frequency produced by voltage controlled oscillator 9 in response to shift register stages $S_e$, $S_f$ and $S_g$ of the shift register 3 at the transmitting station shown in FIG. 1. The output from voltage controlled oscillator 21 at the receiving station shown in FIG. 2 is used to control the demodulation of the received signals by demodulator 20.

FIG. 2 further shows the means for initializing the PN sequence generator of the decoder at the receiving station. More particularly, the contents of shift register stages $S_i$, $S_j$ and $S_k$ are applied to decoder PN sequence generator 30 through gates 31 under the control of the receiving station clock. Alternatively, the modified initializing means shown in FIG. 4 might be used.

OPERATION

Referring again to FIGS. 1 and 2, let us assume that PN sequence generators 2 and 27 have been properly initialized, and that shift registers 3 and 28 have been loaded with identical codes. Further, let us assume that the relationship between $T_s$, the time between shifts, and $T_m$, the length of the matched filter pulse, is given by $T_s = 11T_m$. Finally, let us assume that it is desired to acquire synchronism between the transmitting and the receiving station.

Figure 3A:
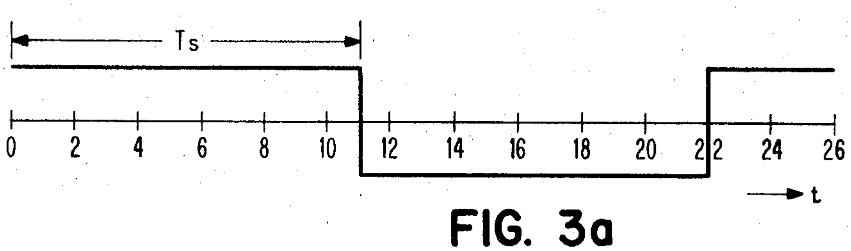
FIGS. 3A–3D show the relationship of the synchronizing waveform to the states of the shift registers at the transmitting and receiving stations.
Figure 3B:
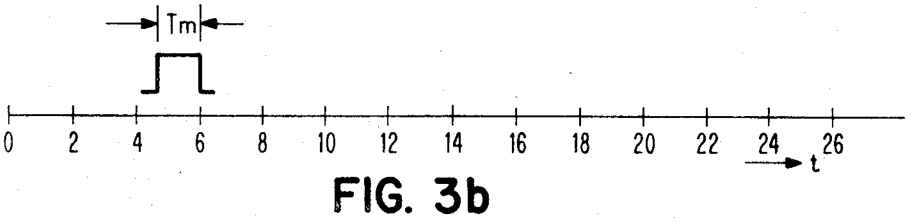

At about midway during the time between shifts of shift register 3 at the transmitting station shown in FIG. 1, or more precisely, at $5T_m$ after the previous shift, the transmitting station clock 1 applies a pulse to tapped delay line 5. As this pulse propagates down delay line 5, it presents itself successively to each of the delay line taps. The resulting signals on the delay line taps are selectively applied to summation device 6 through binary weighting networks $A_1, A_2, \ldots A_n$ under the control of the contents of shift register stages $S_1, S_2, \ldots S_n$. The resulting output from summation device 6 is a peculiar waveform, the shape of which has been determined by the contents of the shift register stages $S_1, S_2, \ldots S_n$. The relative timing of the shift register shifts and the matched filter signal is demonstrated by FIG. 3A & B.

The synchronizing signal from summation device 6 is applied to voltage controlled oscillator 9 which serves to modulate the synchronizing signal to a frequency band determined by the contents of shift register stages $S_e$, $S_f$ and $S_g$ acting through digital-to-analog converter 9. During the generation of the synchronizing signal, the contents of shift register stages $S_i$, $S_j$ and $S_k$ are applied to encoder PN sequence generator 13 through gates 12 under the control of the transmitting station clock. This serves to initialize the encoder PN sequence generator for the subsequent transmission of data.

Figure 3C:
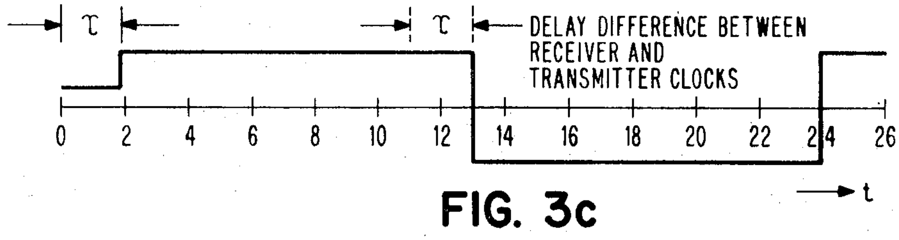
Figure 3D:
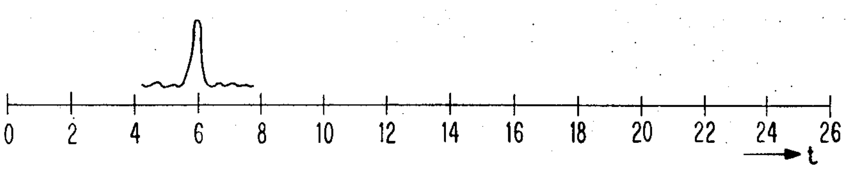

At the receiving station shown in FIG. 2 shift register 28 may be slightly out of synchronism with shift register 3 at the transmitting station. FIG. 3C shows shift register 28 at the receiving station lagging shift register 3 at the transmitting station by approximately $T_m$. FIG. 3D shows the synchronizing signal output from summation device 25. Note that although the shift registers are not in perfect synchronism, they are nevertheless in the same state during the transmission and reception of the synchronizing signal. In fact, receiving station shift register 28 can be out of synchronism by as much as $\pm 5T_m$ and still provide proper reception and decoding of the synchronizing signal. On the other hand, if the receiving station shift register 28 is out of synchronism by a greater margin, the synchronization of the entire system will be irretrievably lost and resort must be had to some external means to start up the system once again.

The basic synchronizing signal is recovered from its frequency band by demodulator 20 under control of the output signal from voltage controlled oscillator 21 which is in turn controlled by the contents of shift register stages $S_e$, $S_f$ and $S_g$ through digital-to-analog converter 29. The synchronizing signal from demodulator 20 is tied to tapped delay line 24. As the synchronizing signal propagates down delay line 24 it is selectively permitted to pass through certain of the binary weighting networks $B_1, B_2, \ldots B_n$ under the control of the contents of shift register stages $S_1, S_2, \ldots S_n$. Summation device 25 serves to collect the signals from the delay line taps and assemble them into a correlation pulse. This pulse serves to synchronize receiving station clock 26 via envelope detector 32. Clock 26 in turn drives PN sequence generator 27 which in turn loads shift register 28. The output pulse from summation device 25 also operates gates 31 to apply the contents of shift register stages $S_i$, $S_j$ and $S_k$ to the decoder PN sequence generator 30 so as to initialize it for subsequent decoding of transmitted data.

While the invention has been particularly shown and described with reference to a particular embodiment, it will be understood by those skilled in the art that changes in the form and details may be made therein without departing from the spirit and scope of the invention.

I claim:

1. In an anti-jam communications system, means for synchronizing the receiving station clock to the transmitting station clock comprising:

a first shift register PN sequence generator at said transmitting station for generating binary PN sequences under control of the transmitting station clock;

a signal shaping network responsive to selected stages of said first shift register PN sequence generator for producing output signals at predetermined intervals under control of the transmitting station clock, the shape of said output signals being controlled by the contents of said selected stages;

a first variable frequency oscillator responsive to selected stages of said first shift register PN sequence generator for producing an output signal, the frequency of which is controlled by the contents of said selected stages;

a modulator at said transmitting station for modulating the output signal from said first variable frequency oscillator with the output signal from said signal shaping network so as to form a transmission signal;

a second shift register PN sequence generator at said receiving station for generating PN sequences under control of the receiving station clock, said second shift register PN sequence generator being identical to said first PN sequence generator at said transmitting station;

a second variable frequency oscillator responsive to selected stages of said second shift register PN sequence generator for producing an output signal, the frequency of said output signal being controlled by the contents of said selected stages so as to correspond to the frequency of the output signal from said first variable frequency oscillator;

a demodulator at said receiving station for demodulating the transmission signal from said modulator under control of the signal from said second variable frequency oscillator so as to recover a signal corresponding to the signal produced by said signal generator at said transmitting station;

a signal decoding network controlled by selected stages of said second shift register PN sequence generator so as to respond exclusively to a demodulated signal of a particular shape to produce an output pulse for synchronizing the receiving station clock, said shape being determined by the contents of said selected stages.

2. In an anti-jam communications system, synchronizing means of the type described in claim 1 wherein the signal shaping network comprises:

a tapped delay line filter, each tap including a variable impedance device, the impedance of which is controlled by the contents of a selected stage of said first shift register PN sequence generator.

3. In an anti-jam communications system, synchronizing means of the type described in claim 1 wherein the first variable frequency oscillator comprises:

a digital-to-analog converter responsive to the contents of selected stages of said first shift register PN sequence generator; and a voltage controlled oscillator responsive to the output from said digital-to-analog converter.

4. In an anti-jam communications system of the type wherein a shift register PN sequence generator is employed at the transmitting station for the purpose of encoding the data to be transmitted, and an identical shift register PN sequence generator is employed at the receiving station for the purpose of decoding the transmitted data, synchronizing means of the type described in claim 1 including:

means for transferring the contents of selected stages of said first shift register PN sequence generator to selected stages of the shift register PN sequence generator which is employed for the purpose of encoding the data to be transmitted.

5. In an anti-jam communications system, synchronizing means of the type described in claim 1 wherein the signal shaping network comprises:

a delay line for receiving pulses from said transmitting station clock;

a plurality of taps disposed along the length of said delay line for sensing the pulses transmitted along said delay line at successive intervals;

a variable impedance device connected to each tap, the impedance of each variable impedance device being controlled by the contents of a corresponding stage of said first shift register PN sequence generator; and a summation device for summing the outputs from said variable impedance devices so as to form a signal, the shape of which is determined by the contents of the stages of said first shift register PN sequence generator.

6. In an anti-jam communications system, synchronizing means of the type described in claim 5 wherein each variable impedance device comprises a gate, the condition of which is controlled by the corresponding stage of said first shift register PN sequence generator.

7. In an anti-jam communications system, means for synchronizing the receiving station clock to the transmitting station clock comprising:

a first shift register PN sequence generator at said transmitting station for generating binary PN sequences under control of the transmitting station clock;

a signal shaping network responsive to selected stages of said first shift register PN sequence generator for producing synchronizing signals at predetermined intervals under control of the transmitting station clock, the shapes of said output signals being controlled by the contents of said selected stages;

a second shift register PN sequence generator at said receiving station for generating PN sequences under control of the receiving station clock, said second shift register PN sequence generator being identical to said first PN sequence generator at said transmitting station;

a signal decoding network controlled by selected stages of said second shift register PN sequence generator so as to respond exclusively to synchronizing signals of particular shapes so as to produce an output pulse for synchronizing the receiving station clock said shapes being determined by the contents of said selected stages.

* * * * *